(12) United States Patent
Wang et al.

(10) Patent No.: US 10,289,951 B2
(45) Date of Patent: May 14, 2019

(54) VIDEO DEBLURRING USING NEURAL NETWORKS

(71) Applicant: ADOBE INC., San Jose, CA (US)

(72) Inventors: Oliver Wang, Seattle, WA (US); Jue Wang, Woodinville, WA (US); Shuochen Su, Vancouver (CA)

(73) Assignee: Adobe Inc., San Jose, CA (US)

( * ) Notice: Subject to any disclaimer, the term of this patent is extended or adjusted under 35 U.S.C. 154(b) by 91 days.

(21) Appl. No.: 15/341,875

(22) Filed: Nov. 2, 2016

(65) Prior Publication Data

US 2018/0121767 A1     May 3, 2018

(51) Int. Cl.
| | |
|---|---|
| *G06N 3/08* | (2006.01) |
| *G06T 11/60* | (2006.01) |
| *G06T 5/00* | (2006.01) |
| *G06T 5/50* | (2006.01) |
| *G06N 3/04* | (2006.01) |
| *G06K 9/62* | (2006.01) |

(52) U.S. Cl.
CPC .............. *G06N 3/08* (2013.01); *G06K 9/6256* (2013.01); *G06K 9/6262* (2013.01); *G06N 3/04* (2013.01); *G06T 5/003* (2013.01); *G06T 5/50* (2013.01); *G06T 11/60* (2013.01); *G06T 2207/10016* (2013.01); *G06T 2207/20081* (2013.01); *G06T 2207/20084* (2013.01); *G06T 2207/20201* (2013.01)

(58) Field of Classification Search
CPC .......... G06K 9/66; G06K 9/6215; G06N 3/04; G06N 3/08; G06T 5/003; G06T 5/50; G06T 7/204; G06T 11/60; G06T 2207/10016; G06T 2207/20081; G06T 2207/20201; G06T 2207/20221

USPC ......................................................... 382/157
See application file for complete search history.

(56) References Cited

U.S. PATENT DOCUMENTS

| | | | |
|---|---|---|---|
| 7,616,220 B2 * | 11/2009 | Baxter .................... | G06T 13/80 345/473 |
| 2009/0167909 A1 * | 7/2009 | Imagawa .............. | G06T 3/4053 348/262 |
| 2017/0078718 A1 * | 3/2017 | Ioffe ................ | H04N 21/23439 |

OTHER PUBLICATIONS

Lee, Wen-Hao, Shang-Hong Lai, and Chia-Lun Chen. "Iterative blind image motion deblurring via learning a no-reference image quality measure." Image Processing, 2007. ICIP 2007. IEEE International Conference on. vol. 4. IEEE, 2007.*

(Continued)

*Primary Examiner* — Jonathan S Lee
(74) *Attorney, Agent, or Firm* — Shook, Hardy & Bacon L.L.P.

(57) ABSTRACT

Methods and systems are provided for deblurring images. A neural network is trained where the training includes selecting a central training image from a sequence of blurred images. An earlier training image and a later training image are selected based on the earlier training image preceding the central training image in the sequence and the later training image following the central training image in the sequence and based on proximity of the images to the central training image in the sequence. A training output image is generated by the neural network from the central training image, the earlier training image, and the later training image. Similarity is evaluated between the training output image and a reference image. The neural network is modified based on the evaluated similarity. The trained neural network is used to generate a deblurred output image from a blurry input image.

20 Claims, 7 Drawing Sheets

(56) References Cited

OTHER PUBLICATIONS

Wieschollek, Patrick, et al. "End-to-end learning for image burst deblurring." Asian Conference on Computer Vision. Springer, Cham, 2016.*
Su, S., Delbracio, M., Wang, J., Sapiro, G., Heidrich, W., & Wang, O. (Jul. 2017). Deep video deblurring for hand-held cameras. In CVPR (vol. 2, p. 6). (Year: 2017).*
Wieschollek, P., Hirsch, M., Schölkopf, B., & Lensch, H. P. (Oct. 2017). Learning Blind Motion Deblurring. In ICCV(pp. 231-240). (Year: 2017).*
Nah, Seungjun, Tae Hyun Kim, and Kyoung Mu Lee. "Deep multi-scale convolutional neural network for dynamic scene deblurring." CVPR. vol. 1. No. 2. 2017. (Year: 2017).*
Sun et al., "Learning a Convolutional Neural Network for Non-uniform Motion Blur Removal" published Apr. 12, 2015, 9 pages.
Delbracio et al., "Hand-held Video Deblurring via Efficient Fourier Aggregation" published Dec. 4, 2015, 14 pages.

* cited by examiner

VIDEO DEBLURRING USING NEURAL NETWORKS

BACKGROUND

Video post-production software, such as Adobe® After Effects®, can digitally stabilize video captured by a camera to reduce the movement of objects relative to frames. After stabilization, images of the video will often have motion blur due to, for example, sudden movements of the camera that occurred during capture of the video (e.g., by the user of a handheld camera). Motion blur can also occur when subjects move through frames faster than the exposure rate the camera can clearly capture. A neural network can be trained to remove blur from images, such as images with motion blur. The quality of the output images generated by the neural network depends upon how the neural network was trained and what data it receives to produce the output.

Typically, a neural network is trained by providing one image that the neural network uses to produce a corresponding output image. The output image is compared to a reference image to determine how to adjust the neural network. This approach to training limits the analysis by the neural network to the data contained in the input image, often resulting in low-quality output images. Furthermore, the effectiveness of training can depend on the quality of training images. Prior approaches to training neural networks use a blur kernel to generate training input images from source images for training, resulting in images that poorly represent motion blur. Thus, neural networks trained using these images produce low-quality output images.

SUMMARY

In some aspects, the present disclosure provides an approach to training a neural network for removing blur from images. The approach includes selecting a central training image from a sequence of blurred images (e.g., from a video) along with an earlier training image and a later training image from the sequence based on proximity of those images to the central training image. In some cases, multiple earlier and later training images are selected. A single iteration of training a neural network uses each of these images, which provides information that the neural network can use when attempting to generate a deblurred output training image. For example, the earlier and later training images can provide context to the central training image in the sequence, resulting in higher-quality output training images.

In some aspects, the present disclosure provides for producing simulated motion blur from a sequence of source images (e.g., from a video) to use as training data for neural networks. The sequence of source images can be combined together to produce a simulated blurred image. In some embodiments, the sequence of source images are video images captured at a high frame rate, such as 120 frames per second (fps). These images are combined to simulate video images captured at a lower frame rate. This can include averaging together groups of high frame rate images to produce a simulated blurred image from each group. The simulated blurred images are used as inputs to train a neural network (e.g., as the sequence of blurred images described above), and the high frame rate images are used as reference images to assess the quality of output training images and adjust the neural network. The higher frame rate images are likely to be significantly clearer than the lower frame rate images due to shorter exposure time, while the lower frame rate images accurately represent motion blur. Thus, these images can be used to train a neural network to produce high-quality output images.

BRIEF DESCRIPTION OF THE DRAWINGS

The present invention is described in detail below with reference to the attached drawing figures, wherein.

DETAILED DESCRIPTION

Figure 1:
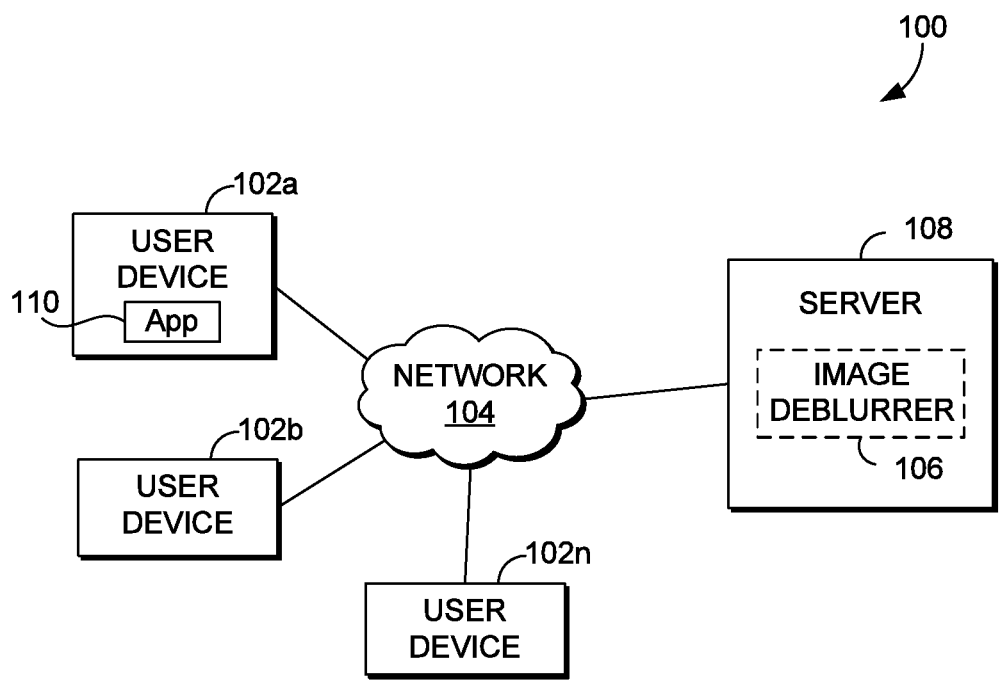
FIG. 1 is a block diagram showing an example of an operating environment, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Training a neural network may generally involve providing the network with a training input image, receiving an output image generated by the network as a solution based on the supplied data, and evaluating the solution against a reference image, representing a desired solution, to determine the quality of the neural network's solution. In order to assess the quality of generated solutions, the system can compare the solutions to known reference images, which may be referred to as ground truth images. The comparison provides feedback used to adjust parameters of the neural network so the neural network is more likely to produce output images that approximate reference images.

In order to train a neural network to deblur images, the network can be provided with training input images that are blurry and its output images can be compared to reference images that represent what the training input images would look like without the blur. Typical approaches to training neural networks simulate blur in a clear image using a blur kernel to produce a blurry training input image. A blur kernel is a matrix operation applied to an image to create a superficial appearance of blur. Due to the one-to-one correspondence between images, a single iteration of training a neural network uses a single blurry training input image along with its corresponding clear image as a reference image. This approach to training is ill suited to deblurring images from vide as it limits the analysis by the neural network to the data contained in the input image.

The present disclosure provides an approach to training a neural network for removing blur from images, which is particularly suited for deblurring images from video. The approach includes multiple training input images the neural network uses to produce a corresponding output training image based on the proximity of the input images in a sequence, such as a video. It is believed that, due to the proximity of the images in the video, they are likely to have similar features with subtle differences, which the neural network can learn how to leverage to produce clearer outputs. For example, these images may vary in terms of blurriness and detail allowing the neural network to learn how to leverage less blurry and more detailed portions from various images. Conventional approaches to training neural networks to deblur images are unable to leverage these potentially related characteristics of images. Further, these images may capture related aspects of true motion blur as it manifests, allowing the neural network to learn deconvolution tailored to motion blur, which is not possible in conventional approaches.

In further respects, it has been found that using a blur kernel to emulate motion blur does not produce images that authentically simulate the features of true motion blur. Therefore, neural networks trained using images produced by a blur kernel perform poorly when deblurring images from video, which may contain true motion blur. In order to properly train a neural network to remove or reduce the amount of motion blur in images, the neural network should receive training data that accurately depicts motion blur. Motion blur can occur in video captured by a camera when the shutter speed of the camera is too low to account for movement within or across a single frame. In general, motion blur can be the result of changes that occur faster than the exposure rate of the camera capturing the image. For example, in 30 frames per second (fps) video, a change that occurs in less than $\frac{1}{30}^{th}$ of a second will appear blurred. This is because the image represents the average of the light the camera received over the $\frac{1}{30}^{th}$ second exposure time. Since motion blur can be different for each subject in the image, according to how the subjects move relative to the camera, the blur can be different for each subject. This means that true motion blur is not generally smooth and uniform throughout an image. This feature of motion blur makes it very difficult to emulate.

The present disclosure provides approaches to accurately simulating motion blur in images. These images can therefore be used to train neural networks that are capable of producing clearer output images from images or video that contains motion blur than conventional approaches. This approach essentially combines light received over multiple frames to produce a single image. This is analogous to how motion blur may occur over long exposure times. The resulting simulated blur in images is, therefore, more similar to true motion blur and the images can be provided to a neural network as training inputs to improve training outcomes.

In various implementations, the aforementioned approach to simulating motion blur is used to generate a simulated blurred video from a source video and images from these videos are used to train a neural network. The source video may be filmed at a high fps (e.g., greater than 90 fps) and combining frames from this video may result in a lower frame rate simulated blurred video (e.g., 30 fps). For each iteration of training the neural network, the central training and the earlier and later training images may be selected from the simulated blurred video and a corresponding reference image may be selected from the source video. In particular, from the source video, a source image used to generate the central training image can be used as the corresponding reference image. Using this approach results in a trained neural network capable of producing significantly higher quality deblurred videos from videos that contain motion blur than conventional approaches.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102a and 102b through 102n, network 104, and server(s) 108.

It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102a through 102n comprise any type of computing device capable of being operated by a user. For example, in some implementations, user devices 102a through 102n are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 in carrying out image deblurring. In some implementations, the application(s) comprises a web application, which can run in a web browser, and could be hosted at least partially on the server-side of environment 100. In addition, or instead, the application(s) can comprise a dedicated application, such as an application having image processing functionality. In some cases, the application is integrated into the operating system (e.g., as a service). It is therefore contemplated herein that "application" be interpreted broadly.

Server 108 also includes one or more processors, and one or more computer-readable media. The computer-readable media includes computer-readable instructions executable by the one or more processors. The instructions may optionally implement one or more components of image deblurrer 106, described in additional detail below.

Image deblurrer 106 can train and operate a neural network in order to deblur images. An input image may refer to an image provided to the neural network, where the neural network generates an output image from the input image. Herein, the images used to train a neural network are referred to as training images. A training input image refers to an input image that is used as a training image. Similarly, a training output image refers to an output image that is used as a training image. Another example of a training image is a reference image. As used herein, a reference image refers to a training image which is used as a standard for evaluating the quality of an output image. The neural network can be updated based on the evaluation in order to improve the quality of future output images produced by the neural network.

In various implementations, image deblurrer 106 is iteratively trained using multiple input images to generate a single output image. In each iteration, image deblurrer 106 selects a central training image as an input training image from a sequence of blurred images. Image deblurrer 106 also selects as input training images earlier and later training images from the sequence with respect to the central image. Image deblurrer 106 uses the neural network to generate an output training image from these input training images.

Also in some implementations, image deblurrer 106 generates the sequence of blurred images from a sequence of source images. For example, image deblurrer 106 can combine the sequence of source images to simulate blur in resultant images, and these resultant images can for the sequence of blurred images. In some embodiments, reference images are selected from the sequence of source images. For example, for a particular iteration, image deblurrer 106 can optionally select training images that use a source image used to generate an input image of the training images as a reference image.

Figure 2:
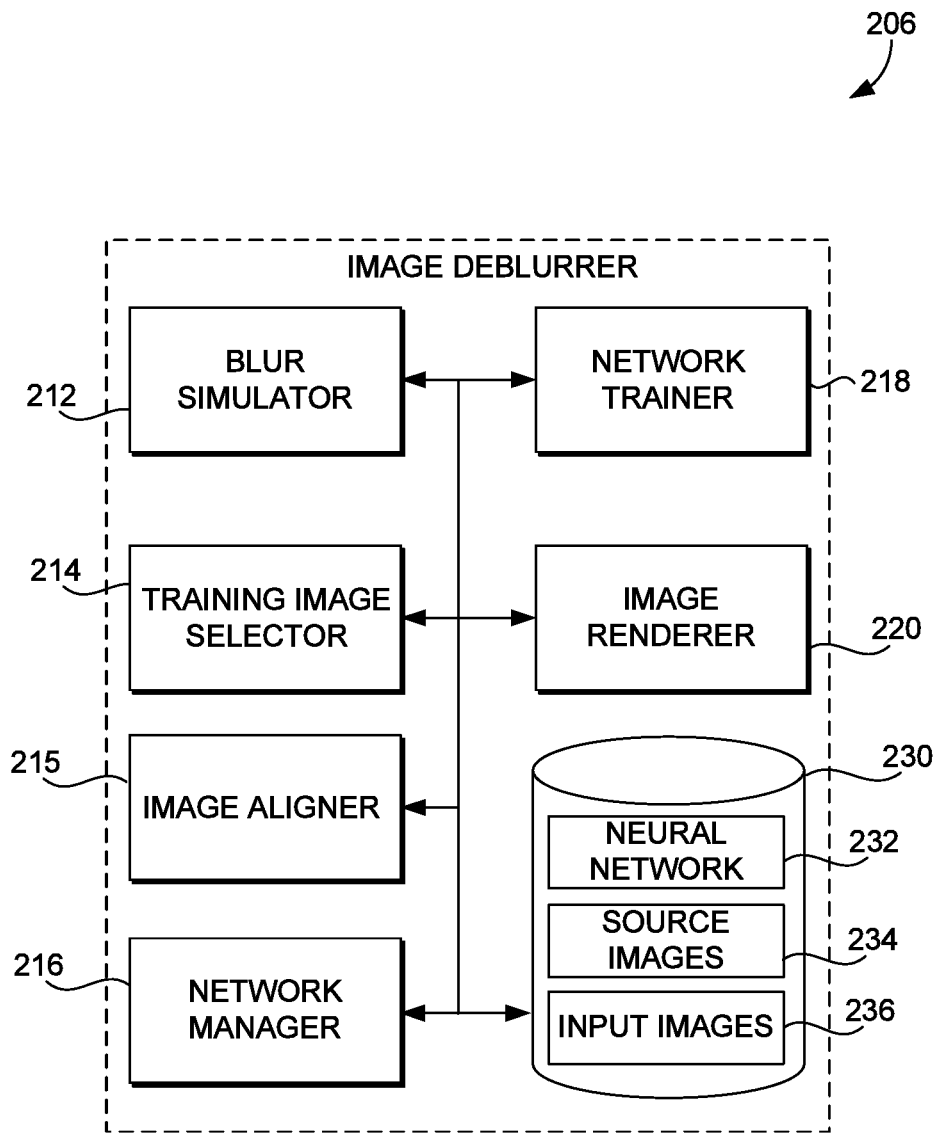
FIG. 2 shows a block diagram of an image deblurrer, in accordance with embodiments of the present disclosure.

Referring to FIG. 2, a block diagram of an image deblurrer is shown, in accordance with embodiments of the present disclosure. Image deblurrer 206 includes blur simulator 212 (e.g., a blur simulator means), training image selector 214 (e.g., a training image selector means), image aligner 215 (e.g., an image aligner means), network manager 216 (e.g., a network manager means), network trainer 218 (e.g., a network training means), image renderer 220 (e.g., an image renderer means), and storage 230. The foregoing components of image deblurrer 206 can be implemented, for example, in operating environment 100 of FIG. 1. In particular, those components may be integrated into any suitable combination of user devices 102a and 102b through 102n, and server(s) 108. For cloud-based implementations, the instructions on server 108 may implement one or more components of image deblurrer 206, and application 110 may be utilized by a user to interface with the functionality implemented on server(s) 108. In some cases, application 110 comprises a web browser. In other cases, server 108 may not be required. For example, the components of image deblurrer 206 may be implemented completely on a user device, such as user device 102a. In this case, image deblurrer 206 may be embodied at least partially by the instructions corresponding to application 110.

Thus, it should be appreciated that image deblurrer 206 may be provided via multiple devices arranged in a distributed environment that collectively provide the functionality described herein. Additionally, other components not shown may also be included within the distributed environment. In addition, or instead, image deblurrer 206 can be integrated, at least partially, into a user device, such as user device 102a. Furthermore, image deblurrer 206 may at least partially be embodied as a cloud computing service.

Storage 230 can comprise computer-readable media and is configured to store computer instructions (e.g., software program instructions, routines, or services), data, and/or models used in embodiments described herein. In some implementations, storage 230 stores information or data received via the various components of image deblurrer 206 and provides the various components with access to that information or data, as needed. In implementations, storage 230 comprises a data store (or computer data memory). Although depicted as a single component, storage 230 may be embodied as one or more data stores and may be in the cloud. Further, the information in storage 230 may be distributed in any suitable manner across one or more data stores for storage (which may be hosted externally).

Sequences of images, such as video, can be stored in storage 130 by image deblurrer 206 as source images 234. In some cases, source images 234 are received into image deblurrer 206 from devices (e.g., user device 102a or another device associated with a user, such as from application 110).

Blur simulator 212 can produce blurred images from source images 234 by combining a group of sequential source images 234 together. In some embodiments, blur simulator 212 uses interpolation between the sequence of images to produce the simulated blur effect. In some embodiments, blur simulator 212 can combine the frames by averaging source images together. The images may be captured with a high-resolution camera at a higher frame rate (e.g., greater than 90 fps), for example, at 120 fps or 240 fps, and the frames can be grouped to simulate 30 fps video. For example, with 240 fps video, a sequence of eight images would be comparable to the light received in a single image captured in the same period of time at 30 fps. By combining together the eight images captured at 240 fps, a single image captured at 30 fps video can be accurately simulated. This approach can be applied to an entire video to produce a lower frame rate version of the video that has simulated blur.

Generating a blur effect by combining sequential images accurately simulates motion blur. The images produced using this approach are significantly improved from approaches that, for instance, apply a blur kernel, because it is comparable to how true motion blur occurs. As an example, when true motion blur occurs, the amount of blur is often different for different elements of the image. For instance, objects in the foreground may appear blurred while objects in the background may remain clear. The approach used by blur simulator 212 allows for more realistic blurring effects, which in turn allows neural network 232 to be more accurately trained.

Training image selector 214 can select images to be provided to neural network 232 from the images generated by blur simulator 212 for training. In some instances, combining sequential images may produce little or no blur. For instance, if very little changes within a sequence of source images 234, the resulting combined image will not have much blur, if any. Training of neural network 232 is typically faster if the images generated by blur simulator 212 have a substantial amount of blur. Thus, in some embodiments, training image selector 214 selects images with a blur level above a threshold as the central training image. The central training image, as the term is used herein, is the input training image selected to be deblurred. In some embodiments, training image selector 214 quantifies the blur level in terms of image gradient. The image gradient can correspond to a value that represents how different each pixel is from its neighboring pixel. Images with sharp clear lines will have a higher image gradient than images with a large amount of blur. By comparing the image gradient for neighboring images, training image selector 214 can identify the image with the lowest gradient as having a higher blur level than its neighboring images, and select this image as a training image. In some embodiments, training image selector 214 fits a smooth line to the image gradient value or other blur level value for each image in a sequence. Training image selector 214 can identify the images that fall below this smooth line as relatively blurry and selects central training images from these images.

The image gradient is one example of a blur measurement algorithm training image selector 214 may apply to quantify the blur level of an image. In some embodiments, a user can set or otherwise configure the threshold blur level used for selecting an image (e.g., using application 110). In some embodiments, training image selector 214 selects a patch of a larger training image to use as a training image. For example, a larger training image may have only a single portion, or patch, with significant motion blur. Rather than selecting the entire image, training image selector 214 can provide only the blurry patch to the neural network 232 as a training image. In another example, a single image may include several patches with a sufficient level of blur. Training image selector 214 can provide each of these patches separately or together. Processing patches in this way can allow neural network 232 to be trained faster than processing the entire larger training image.

Figure 3:
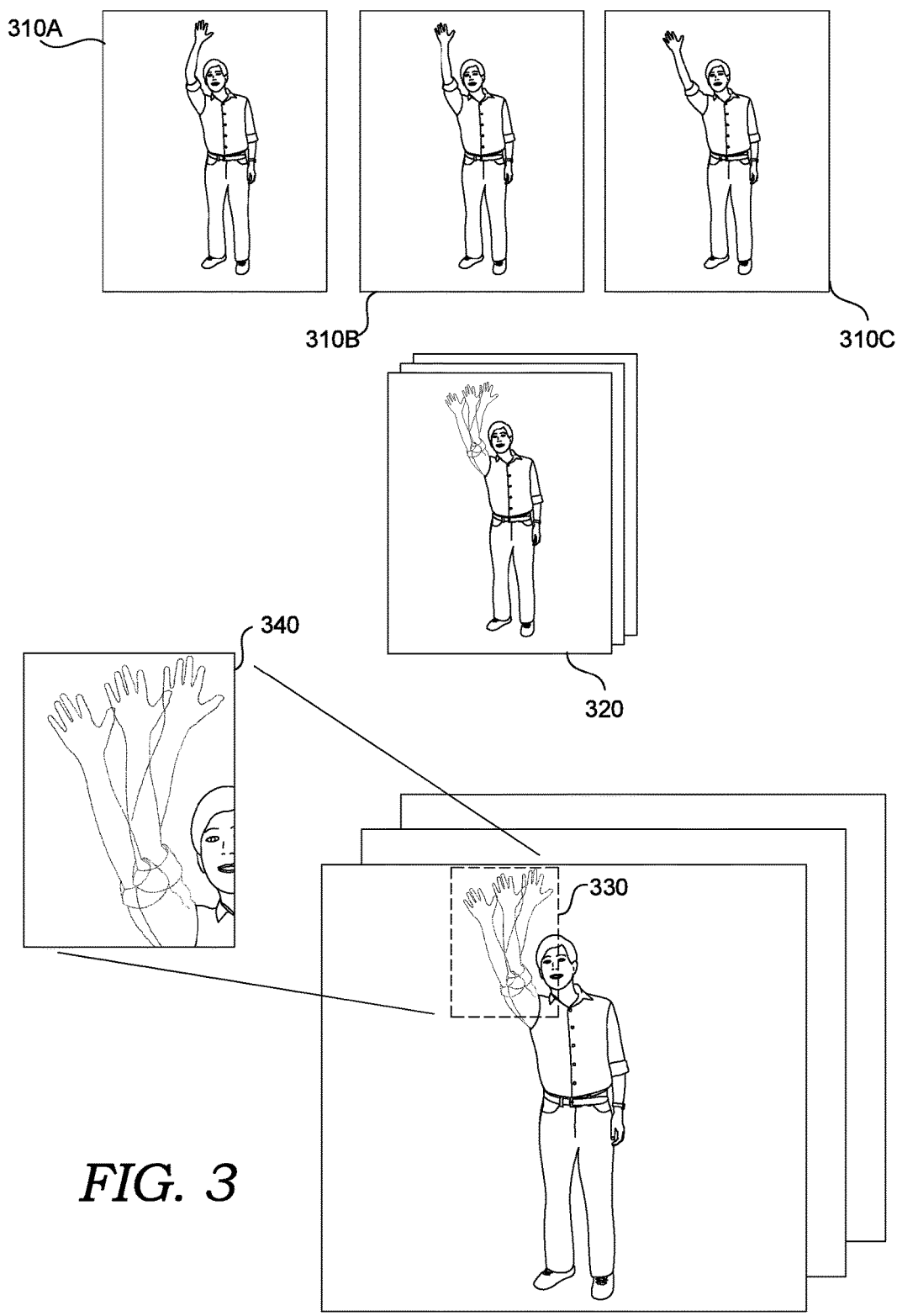
FIG. 3 shows an illustration descriptive of a method of simulating blur, in accordance with embodiments of the present disclosure.

To illustrate the forgoing, FIG. 3 provides an illustration description of a method of simulating blur, in accordance with some embodiments of the present disclosure. In some embodiments, images 310A-C are provided to blur simulator 212. Blur simulator 212 combines images 310A-C into blurred image 320. As indicated in FIG. 3, a large amount of motion blur occurs in portion 330 of blurred image 320 relative to other portions of the image. Training image selector 214 can identify portion 330 (e.g., using a blur level) to select and isolate portion 330 and to produce blurred patch 340. Training image selector 214 can use this extracted patch as a training input image for neural network 232.

Returning to FIG. 2, as indicated above, training image selector 214 can use an image selected in accordance with aspects of this disclosure as a training input image. In some embodiments, training image selector 214 can provide training input images, generated and selected in accordance with this disclosure, to a neural network as part of a sequence of images, with the selected training input image acting as the central training image.

By evaluating training images similar to the central training image, for example, training images preceding and following the image in a sequence, neural network 232 will have additional information with which to determine how the deblurred image should look. To that end, in some implementations, training image selector 114 can select additional images to be provided to neural network 232 as training input images along with a central training image.

It is noted that training input images can be provided according to other training approaches as well. In particular, in some cases, a central, earlier, and later training input image need not be employed. For example, in other embodiments, the approach to simulating blur in images is used to produce training input images while only using a single training input image to produce an training output image. In other embodiments, multiple training input images may be employed, but they may be selected based on different criteria than discussed herein.

Training image selector 214 can select as training input images a set of neighboring training images which surround the central training image in a sequence of images, such as a video. The set of neighboring training images can include at least one earlier training image and at least one later training image in relation to the central training image. In some embodiments, training image selector 214 selects multiple earlier training images or frames and later training images or frames to be provided along with the central training image (e.g., at least two earlier training frames and at least two later training frames). Training image selector 114 can identify the earlier training images and later training images based on their proximity to the central training image, with the earlier training image coming before the central training image and the later training image coming after the central training image in a sequence of images, such as a video.

In some embodiments, the earlier training image may be the image immediately preceding the central training image in the sequence of images. Likewise, in some embodiments, the later training image may be the image immediately after the central training image in the sequence of images. Training image selector 214 may select each neighboring training image based on a distance of the image from the central image in the sequence. For example, training image selector 214 could select a designated number (e.g., 2, 3, etc.) of sequential earlier training images immediately preceding the central training image, and a designated number (e.g., 2, 3, etc.) of sequential later training images immediately following the central training image. In some embodiments, training image selector 214 is preconfigured to select the designated number of images.

In some embodiments, an image aligner 215 can first align the training images prior to them being provided to neural network 232 for training. Alignment may refer to a process by which image aligner 215 attempts to match features in the earlier and later training images with features found in the central training image. In some embodiments, image aligner 215 can warp multiple ones of the images together thereby producing an aligned training input image. In some embodiments, image aligner 215 uses computational techniques such as optical flow estimation in order to align frames. Optical flow estimation refers to computing the pixel displacement between two images. The image aligner can then warp the earlier and later training input images to minimize the displacement to the central training image.

It is noted that image aligner 215 need not process frames prior to providing the images to neural network 232. In some embodiments, the functionality of image aligner 215 is performed by neural network 232, as discussed below. Further, image aligner 215 need not operate on images selected as training input images. Instead, image aligner 215 can operate on a sequence of images, and training image selector 214 can subsequently select training input images from the processed sequence.

Network trainer 218 can provide training input images, prepared and selected by training images selector 214 and optionally image aligner 215, to neural network 232 for training. Neural network 232 produces a training output image from the training input images.

Neural network 232 can comprise a plurality of interconnected nodes with a parameter, or weight, associate with each node. Each node receives inputs from multiple other nodes and can activate based on the combination of all these inputs, for example, when the sum of the input signals is above a threshold. The parameter can amplify or dampen the input signals. For example, a parameter could be a value between 0 and 1. The inputs from each input can be weighted by a parameter, or in other words multiplied by the parameter, prior to being summed. In this way, the parameters can control the strength of the connection between each node and the next. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation.

In some embodiments, neural network 232 may be a convolutional neural network. A convolutional neural network (CNN) may refer to a neural network architecture wherein data inputs are separated into overlapping tiles. For each layer of the CNN, the parameters that determine node activation at that layer may be shared amongst each tile on that layer. For example, in a CNN for removing blur from an image, each input image can be separated into tiles, or a portion of the input images, which overlap each other. By applying the same parameters to each tile, a CNN applies uniform image processing across the whole image. Overlapping the tiles prevents visual artifacts or errors in the output image from occurring at the boundaries between patches. Additionally, since each tile applies the same parameters, a CNN can rely on fewer parameters than other neural network structures.

Figure 4:
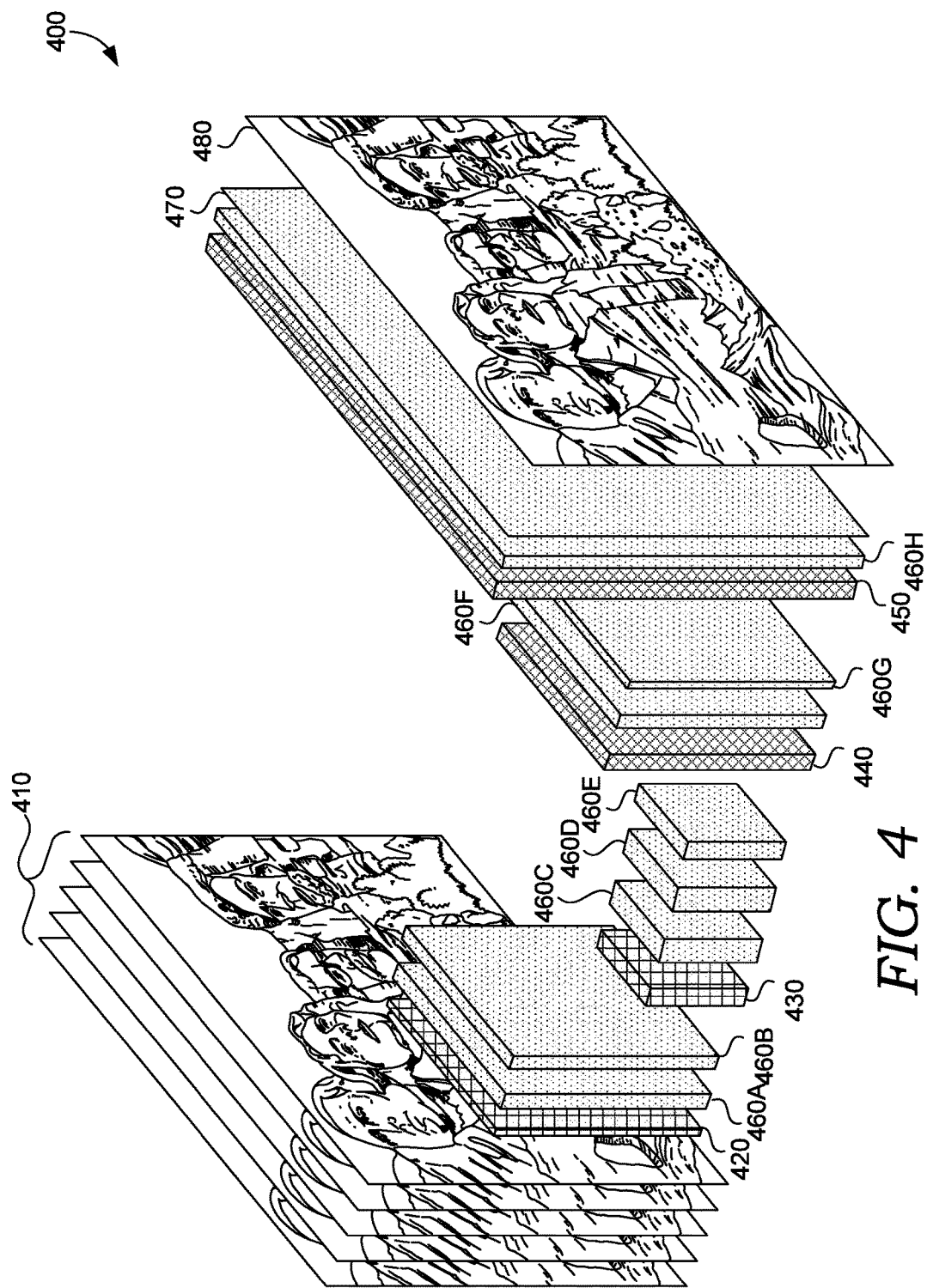
FIG. 4 shows an example of a neural network, in accordance with embodiments of the present disclosure.

FIG. 4 shows a schematic of one possible embodiment of neural network 400. Neural network 400 may be implemented in image deblurrer 206 as neural network 232. Neural network 400 can receive training images 410 and generate training output image 480. Neural network 400 comprises low level down convolutional layer 420, high level down convolutional layer 430, high level up convolutional layer 440, and low level up convolutional layer 450. The network additionally comprises flat convolutional layers 460A-H that can follow after the down convolutional and up convolutional layers. Loss function 470 can be the last layer of neural network 400. Training images 410 can be received by neural network 400. Training images 410 can include the central training image, earlier training image, and later training image selected by training image selector 214.

Much of the behavior of a neural network is an emergent quality of the training process, so the behavior of each level is not generally known with much precision. As is known, down convolutional layers receive a larger number of input signals and pass a smaller number of output signals to the next layer. For instance, low level down convolutional layer 420 can receive all the information about every pixel in training images 410, including the brightness in each of the red, green, and blue color channels. If, for example, this corresponds to 3 million bits of information, low level down convolutional layer 420 can pass, for example, only 1 million bits to the next layer. It is not known, in general, what exactly the information output represents, but it can be thought of as somewhat generalized information based on the input images. For example, the down convolutional process might receive information that indicates a pixel is the same in three of the input images and might respond by sending forward one pixel of information instead of all three. It may also be that the down convolutional layer consolidates information if a group of neighboring pixels match each other.

As is known, flat convolutional layers, such as flat convolutional layers 460A-H, pass the same number of outputs as inputs received. Flat convolutional layers can be thought of as manipulating the inputs received to produce outputs without increasing or decreasing the level of generality. As is known, up convolutional layers pass a greater number of outputs than inputs received. Up convolutional layers can be thought of as extrapolating information from the generalized layers. At a high level, the combination of layers of the neural network can be thought of as distilling information related to key features in the training images and generating a new image by manipulating and extrapolating from these key features. It has been found that neural network 400 is an architecture which performs well in deblurring video that may contain motion blur. It is noted that neural network 400 illustrates one suitable architecture for neural network 232, but any suitable architecture can be employed.

Neural network 232 can produce training output image 480 based on training images 410 and the parameters discussed above. Network trainer 218 can train neural network 232 by evaluating similarity between a reference image and training output image 480 produced by neural network 232. In some embodiments, the reference image can correspond to the central training image. For example, the reference image may have been one of the group of sequential source images combined to generate the central training image. Training involves modifying the neural network based on the similarity between the reference image and the training output image. In some embodiments, modifying the neural network involves changing at least one of the node parameters. In some embodiments, the similarity metric used by network trainer 218 is quantified using loss function 470. This can include calculating the sum of the least square error for each pixel in the training output image compared to the corresponding pixel of the reference image. Network trainer 218 can minimize loss function 470 of neural network 232, for example, through backwards propagation of errors.

In some embodiments, image deblurrer 206 includes a network manager 216. Network manager 216 can manage the trained neural network. A trained neural network is a neural network that has undergone at least one round of training. In some embodiments, network manager 216 determines if the trained neural network is sufficiently trained and is suitable for use. In such embodiments, network manager 216 can require network trainer 218 to repeat the training as described herein for multiple iterations with multiple different images used as the central training image in each iteration. This may improve the accuracy of neural network 132 in deblurring images. In some embodiments, network manager 216 may monitor loss function 470 of neural network 232 to determine that the error is below a certain threshold and complete or terminate training of the neural network based on the error being below the threshold. In some embodiments, a user may provide the error threshold. Network manager 216 can determine that neural network 232 is sufficiently trained based on, for instance, detecting the rate of change in the error has plateaued.

In execution, neural network 232, trained according to the present disclosure, can be used to deblur images. The method of deblurring can be similar to the process described for training neural network 232, however in execution the input images are typically not generated from source images as the training input images were, and are not typically evaluated against a reference image. For example, network manager 216 may receive a sequence of input images 236 from storage 230, including a central input image, an earlier input image, and a later input image selected from the sequence of images by network manager 216. Trained neural network 232 produces a deblurred image based on the sequence of input images 236. In order to deblur an entire video, each frame of the video may optionally be used as a central input image to generate a corresponding output image, and the output image can be used in place of the central input image in the deblurred video.

In some embodiments, image renderer 220 displays the output image(s) and/or deblurred video sequence to the user (e.g., in application 110 on user device 102*a*).

Figure 5:
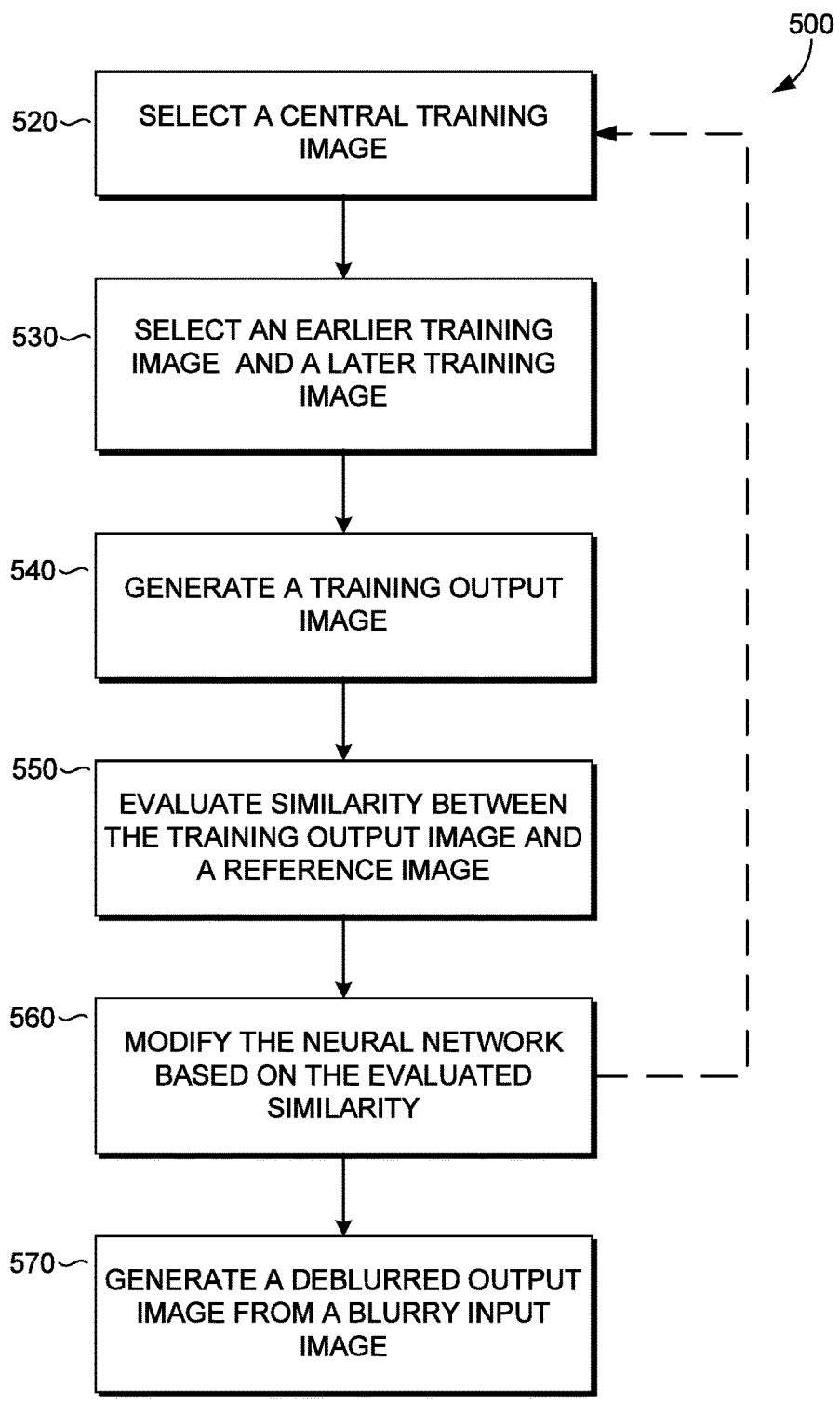
FIG. 5 is a flow diagram showing a method for deblurring images, in accordance with embodiments of the present disclosure.

With reference to FIG. 5, a flow diagram is provided showing an embodiment of a method 500 for deblurring images. At blocks 520-570, method 500 includes steps for training neural network 232.

At block 520, method 500 includes selecting a central training image from the sequence of blurred training images. For example, training image selector 214 can select the central training image from the training images. In some embodiments, training image selector 214 can determine the blur level of the central training image and can select the central training image based on the determined blur level.

At block 530, method 500 includes selecting an earlier training image and a later training image based on the earlier training image preceding the central training image in the sequence and the later training image following the central training image in the sequence.

At block 540, method 500 includes generating, using neural network 232, a training output image from the central training image, the earlier training image, and the later training image. For example, training image selector 214 can select the images proximate to the central training image to be the earlier training image and the later training image. In some embodiments, training image selector 214 selects more than one earlier image and more than one later image and uses a longer sequence of training images.

At block 550, method 500 includes evaluating the similarity between the training output image and a reference image. In some embodiments, the reference image can be one of sequential source images 234 used to generate the sequence of simulated blurred images. For example, network trainer 218 can evaluate the similarity using loss function 470.

At block 560, method 500 includes modifying the neural network based on the evaluated similarity. For example, network trainer 218 can modify neural network 232 using backwards propagation of errors. As indicated in FIG. 5, the foregoing blocks may be repeated any number of times to train the neural network (e.g., with a different central training image in each iteration).

Having trained the neural network according to blocks 520-560, at block 570, method 500 includes generating, by the trained neural network, a deblurred output image from a blurry input image. For example, network manager 216 can determine that neural network 232 is sufficiently trained and can provide neural network 232 a series of input images 236.

Figure 6:
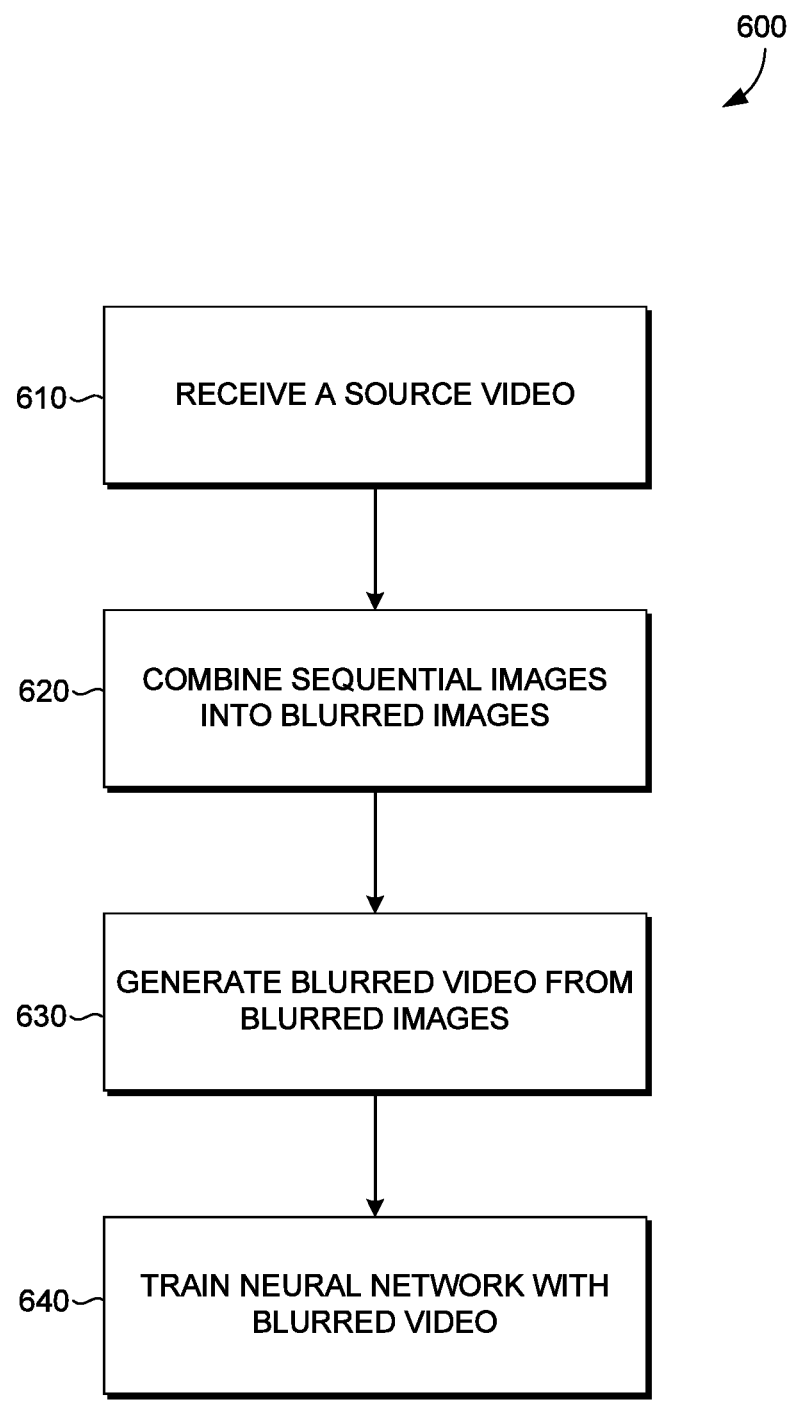
FIG. 6 is a flow diagram showing a method for generating simulated blurred images, in accordance with embodiments of the present disclosure.

With reference to FIG. 6, a flow diagram is provided showing an embodiment of a method 600 for generating simulated blurred images. Method 600 can be performed by blur simulator 212.

At block 610, method 600 includes receiving a source video. For example, source images 234 can correspond to a source video. The source video can be a digital video captured at a high frame rate, such as 120 or 240 fps.

At block 620, method 600 includes combining groups of sequential images into a simulated blur image. For example, combining can include making each image in each group proportionally opaque or otherwise increasing the transparency of the images. If eight images are in a group, blur simulator 212 can make each image 12.5%, ($\frac{1}{8}^{th}$) opaque, or 87.5% transparent and combine the proportionally opaque images into a single combined image; each of the 8 images contributing $\frac{1}{8}^{th}$ of the combined image. This process effectively averages the contribution from each image. Any stationary portions of the group of images can remain unchanged in the group of images, while portions that move can appear overlapped and transparent, approximating blur. Additionally, in some embodiments, combining images can include calculating a pixel vector between each of the sequential images in a the group. The pixel vector represents the change in each corresponding pixel between a first sequential image in the group and a second sequential image in the group. For example, the pixel vector can be used to estimate the motion that might have occurred between the first and second sequential images. Blur simulator 212 can interpolate a blur between the proportional images using the pixel vector. This interpolated blur can enhance the motion blur by smoothing the transition between each proportionally opaque image. In some embodiments, this process can be repeated with a second group of source images to produce another simulated blurred image. For example, the second group of source images can comprise one or more of the source images from the first group of source images, such that the first and second groups of images essentially overlap. Alternatively, the first and second groups of images have no source images in common.

At block 630, method 600 includes generating a simulated blurred video from the sequence of simulated blurred images. In some embodiments, the simulated blurred video may have a lower frame rate as compared to the source video. For example, in the case that separate groups of images have no source images in common, a first number of source images will produce a smaller number of simulated blurred images. If the source images come from a video captured at 240 fps and the images are combined in groups of 8 images, the simulated blurred video produced would be equivalent to 30 fps.

At block 640, method 600 includes training a neural network using images from the simulated blur video as inputs and images from the source video as reference images. For example, network trainer 218 can provide one or more images from the simulated blurred video to the neural network as training images.

Figure 7:
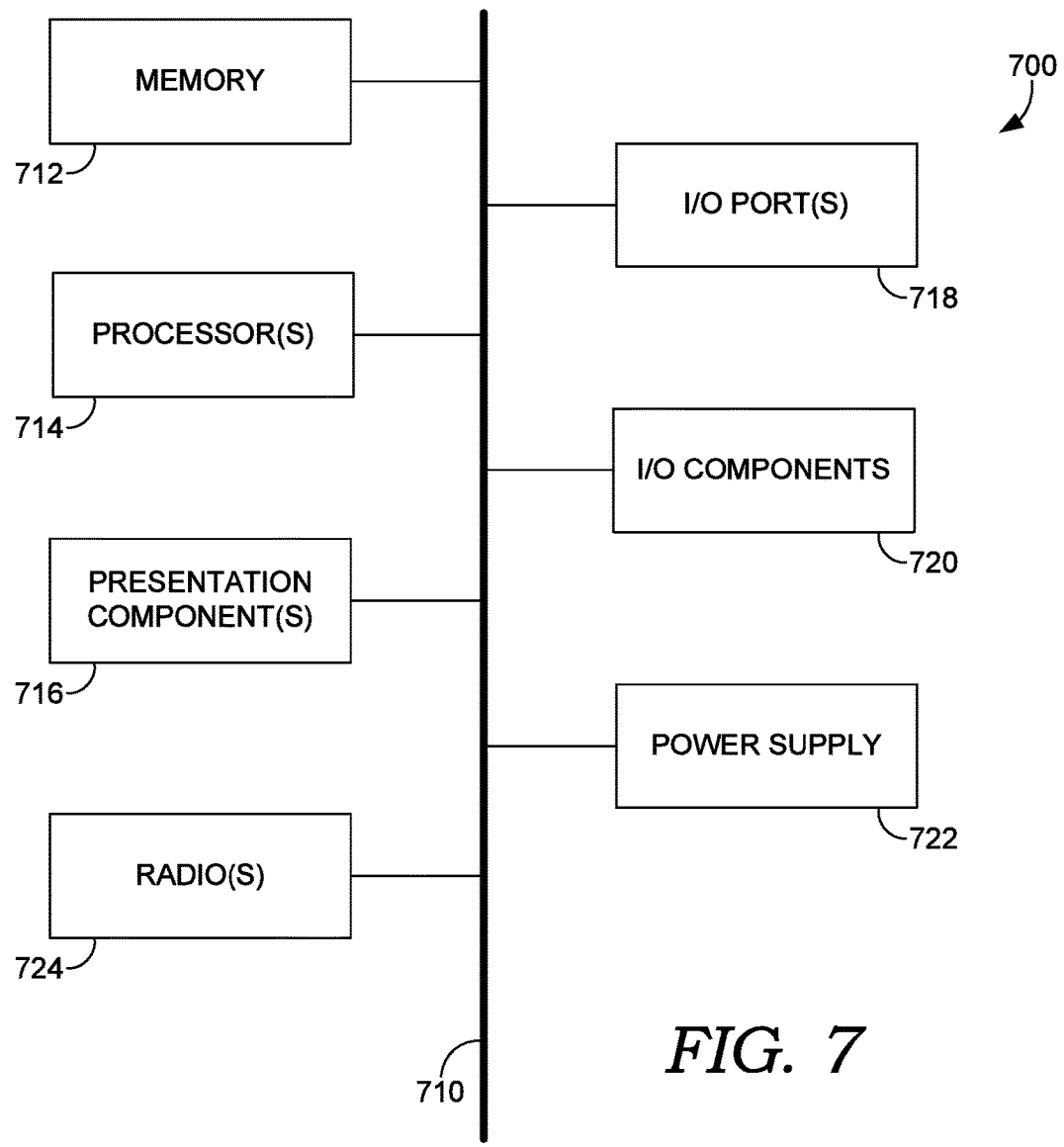
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

As can be understood, implementations of the present disclosure provide for removing blur from images. The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method for deblurring images, the method comprising:
   training a neural network, the training comprising:
      selecting a central training image from a sequence of blurred images based on a blur level of the central training image, the sequence of blurred images corresponding to a simulated blurred video;
      selecting an earlier training image that precedes the central training image based on a proximity of the earlier training image to the central training image in the sequence;

selecting a later training image that follows the central training Image based on a proximity of the later training image to the central training image in the sequence;

generating, by the neural network, a training output image from the central training image, the earlier training image, and the later training image;

comparing the training output image to a reference image from a source video, wherein the source video is a higher frame rate version of the simulated blur video; and adjusting the neural network based on the comparing; and causing the trained neural network to generate a deblurred output image from a blurry input image.

2. The method of claim 1, further comprising determining blur levels corresponding to the sequence of blurred images.

3. The method of claim 1, further comprising generating the simulated blurred video for use in said training of the neural network, wherein said generating comprises:

selecting groups of sequential source images from the source video, wherein the source video is a captured digital video; and generating the sequence of blurred images by combining the groups of sequential source images.

4. The method of claim 1, further comprising:

combining a group of sequential source images to form the central training image; and selecting the reference image from the group of sequential source images.

5. The method of claim 1, further comprising:

combining frames of the source video to form frames of the simulated blurred video resulting in the simulated blurred video having a lower frame rate than the source video; and selecting the reference image from the frames of the source video.

6. The method of claim 1, further comprising extracting the central training image as a patch from a larger central training image.

7. The method of claim 1, further comprising aligning the central training image with the earlier training image and the later training image, wherein the generating of the training output image uses the aligned central training image, the aligned earlier training image, and the aligned later training image.

8. The method of claim 1, wherein the neural network generates the training output image from a plurality of earlier training images that precede the central training image and plurality of later training images that follow the central training image.

9. The method of claim 1, wherein the selecting of the earlier training image is based on the earlier training image immediately preceding the selected central training image in the sequence, and the selecting of the later training image is based on the later training image immediately following the selected central training image in the sequence.

10. A system comprising:

a blur simulator means for combining groups of sequential source images from a source video together to generate a simulated blur video comprising a sequence of simulated blurred images, wherein the source video is a higher frame rate version of the simulated blur video, and wherein the source video is a captured digital video;

a network trainer means for training a neural network by:

providing training images to a neural network comprising a central training image from the sequence of simulated blurred images, an earlier training that precedes the central training image in the sequence and a later training image that follows the central training image in the sequence;

evaluating similarity between a training output image generated by the neural network from the training images and at least one reference image; and modifying the neural network based on the evaluated similarity; and a network manager means for causing the trained neural network to generate a deblurred output image from a blurry input image.

11. The system of claim 10, further comprising an image aligner means for aligning the central training image with the earlier training image and the later training image.

12. The system of claim 10, further comprising a training image selector means for selecting the at least one reference image from the sequential source images.

13. The system of claim 10, wherein the blur simulator means, for each group of the groups of sequential images, averages together the sequential source images in the group to produce a simulated blurred image of the sequence of simulated blurred images.

14. The system of claim 10, wherein the combining of the groups of sequential source images forms a simulated blurred video having a lower frame rate than the source video, and the sequence of simulated blurred images are of the simulated blurred video.

15. One or more non-transitory computer-readable media having a plurality of executable instructions embodied thereon, which, when executed by one or more processors, cause the one or more processors to perform a method for deblurring images, the method comprising:

training a neural network using a set of iterations, said training comprising for each iteration:

selecting, from a sequence of blurred images associated with a simulated blurred video, a central training image and a set of neighboring training images surrounding the central training image in the sequence, wherein the central training image is selected based on a blur level of the central training image;

generating, by the neural network, a training output image based on the central training image and the set of neighboring training images; and adjusting the neural network based on a comparison between the training output image and a reference image from a source video, wherein the source video is a higher frame rate version of the simulated blurred video.

16. The media of claim 15, wherein the set of neighboring training images includes an earlier training image than the central training image and a later training image than the central training image in the sequence.

17. The media of claim 15, wherein the selecting of the set of neighboring training images is based on a proximity of each neighboring training image to the central training image in the sequence.

18. The media of claim 15, wherein the method further comprises aligning features in the set of neighboring training images with features in the central training image, wherein the generating of the training output image uses the aligned set of neighboring training Images.

19. The media of claim 15, wherein each image in the sequence of blurred images is generated by combining a group of sequential source images to form the image, wherein the source video is a captured digital video.

20. The media of claim 15, wherein the method further comprises extracting the central training image as a patch from a larger central training image.

\* \* \* \* \*